(12) United States Patent
Coleman et al.

(10) Patent No.: US 7,191,598 B2
(45) Date of Patent: Mar. 20, 2007

(54) GAS TURBINE BY-PASS SYSTEM

(75) Inventors: James M. Coleman, Hoover, AL (US); Monroe L. Johnson, III, Sterritt, AL (US); William L. Wallace, Bessemer, AL (US); W. Dean Warnock, Gardendale, AL (US)

(73) Assignee: Process Equipment, Inc., Pelham, AL (US)

( * ) Notice: Subject to any disclaimer, the term of this patent is extended or adjusted under 35 U.S.C. 154(b) by 198 days.

(21) Appl. No.: 10/842,258

(22) Filed: May 10, 2004

(65) Prior Publication Data

US 2005/0005609 A1    Jan. 13, 2005

Related U.S. Application Data

(62) Division of application No. 10/218,818, filed on Aug. 14, 2002, now Pat. No. 6,748,734.

(60) Provisional application No. 60/312,701, filed on Aug. 15, 2001.

(51) Int. Cl.
*F02C 6/00* (2006.01)

(52) U.S. Cl. ................... 60/772; 60/39.182; 122/7 B

(58) Field of Classification Search .............. 60/772, 60/773, 39.182; 122/7 R, 7 B
See application file for complete search history.

(56) References Cited

U.S. PATENT DOCUMENTS

| | | | |
|---|---|---|---|
| 2,358,358 A * | 9/1944 | Stromquist | ................ 122/7 R |
| 3,527,440 A * | 9/1970 | Presslauer | ................ 251/187 |
| 3,805,884 A | 4/1974 | Burt et al. | |
| 4,239,711 A | 12/1980 | Dick et al. | |
| 4,645,083 A | 2/1987 | Vinciguerra | |
| 4,821,507 A | 4/1989 | Bachmann et al. | |
| 4,919,169 A | 4/1990 | Bachmann et al. | |
| 5,299,601 A | 4/1994 | Koch | |
| 5,329,970 A | 7/1994 | Squirrell | |
| 5,370,239 A * | 12/1994 | Kidaloski et al. | ........ 211/85.8 |
| 5,697,596 A | 12/1997 | Kremers et al. | |
| 6,449,957 B1 | 9/2002 | Takamatsu et al. | |
| 6,748,734 B1 * | 6/2004 | Coleman et al. | ........ 60/39.182 |

* cited by examiner

*Primary Examiner*—Ted Kim
(74) *Attorney, Agent, or Firm*—Smith, Gambrell & Russell LLP

(57) ABSTRACT

A gas turbine by-pass system is used between a gas turbine generator outlet nozzle and the inlet of a heat recovery steam generator (HRSG). The system allows operators to divert gasses from the HRSG in combined cycle mode to a silencer assembly to operate in simple cycle mode. The system thereby allows maintenance to be performed to the HRSG by crew of human workers without danger of an encounter with hot lethal gasses. The system includes a monorail and a series of hoists which operators use to position a blank off plate and an expansion joint as necessary with respect to the HRSG and diverter box. Consequently, the system provides for safe operation of a gas turbine in both combined cycle mode and simple cycle mode.

15 Claims, 19 Drawing Sheets

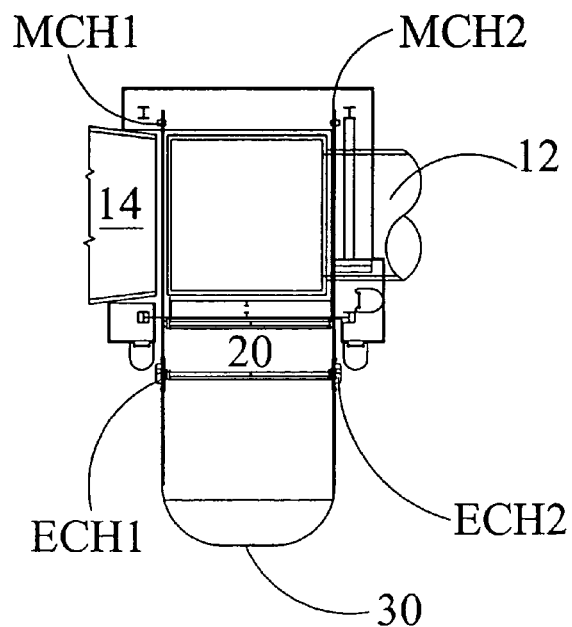
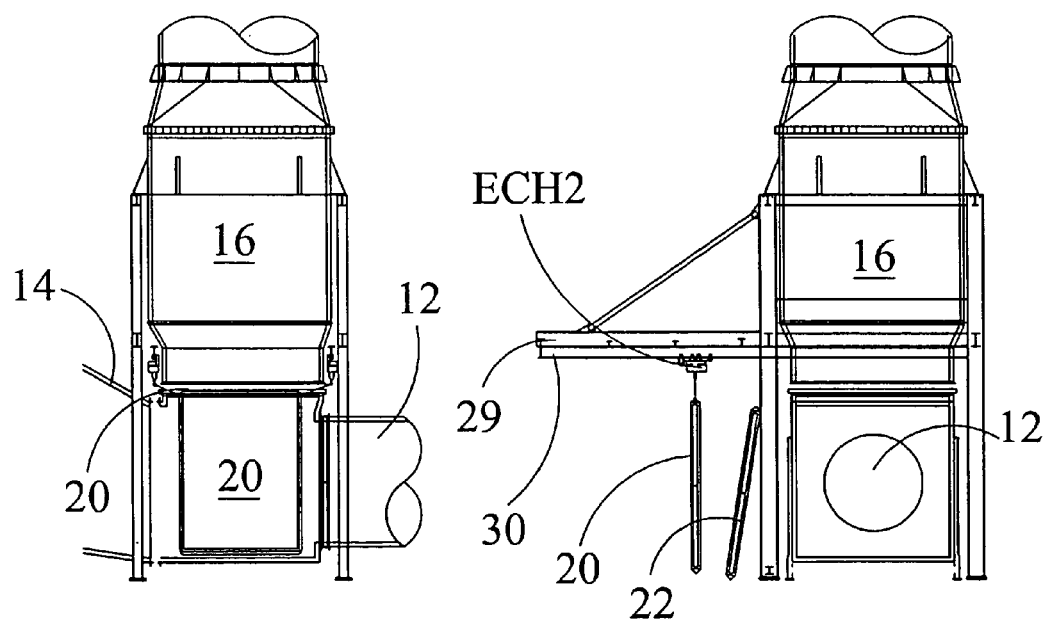
FIG. 9a
FIG. 9b    FIG. 9c

GAS TURBINE BY-PASS SYSTEM

This application is a divisional of U.S. patent application Ser. No. 10/218,818, filed on Aug. 14, 2002, now U.S. Pat. No. 6,748,734, which claims priority from U.S. Provisional Application Ser. No. 60/312,701, as filed on Aug. 15, 2001.

FIELD OF THE INVENTION

The present invention relates to a gas turbine by-pass system, and more specifically, to a gas turbine by-pass system and method for operating the gas turbine by-pass system that provides a safe and secure environment for workers to avoid contact with extremely hot gases.

BACKGROUND OF THE INVENTION

Conventional gas turbine engines burn natural gas, with the hot gasses from the combustion of the natural gas driving a turbine. The heated gases (typically about 1000 degrees Fahrenheit) exiting the turbine pass through an exhaust duct to a heat recovery steam generator (HRSG). The heat from the gasses is then recovered in the HRSG to produce steam, which in turn is used to drive a steam turbine. The cooled gases exit the HRSG to be exhausted through a short stack.

Conventional gas turbines are equipped with a set of dampers or diverters that allow the turbine to operate in either a simple-cycle or a combined-cycle mode. The bypass damper controls flow through the bypass or simple-cycle stack, and the isolation damper controls flow through the HRSG. During start-up operations, the isolation damper is closed, thereby preventing flue gas flow through the HRSG, and the bypass damper is open, allowing flue gas to exit through the bypass stack. This is referred to as simple-cycle operation. Once the turbine has completed start-up procedures the isolation damper is opened and the bypass damper is closed, consequently redirecting flue gas flow through the HRSG. The hot flue gas heats boiler feed water to produce steam, which, once it has reached sufficient quality, is used to drive a steam turbine to produce more electricity. This is referred to as combined-cycle operation.

Gas flow diverters are often employed to deliver hot exhaust gases from a turbine either to a HRSG or to the stack. Many problems are attendant their use due to the large volumes of gases at high temperatures and under substantial pressure that are exhausted by turbines and the necessity that the hinged gas diverter blade be swung into and out of its operative positions relative to the stack and to the steam generator without vibrating and without causing thermal shock on the system. Such diverters are large as are the conduits leading therefrom to the steam generator or to the stack. Consequently, as the conduit to the steam generator must be capable of being safely entered by service personnel, leakage into the HRSG must be prevented when gas flows are diverted to the stack in order to avoid the necessity of placing the turbine out of service.

The diverter dampers that are currently used in gas turbine systems operate to divert the hot exhaust from the gas turbine into the HRSG when the power plant is operated as a combined-cycle facility or into the exhaust stack in the case of simple-cycle operation. Such diverter dampers are typically quite expensive and do not provide long term reliability. Because any maintenance or modification work that may be performed within the HRSG requires that the HRSG be "human-safe," any leakage from a diverter damper cannot be tolerated. As a result, some manufacturers include an isolation guillotine damper as the back the diverter damper. In using a guillotine damper, the guillotine blade is exposed to very high temperatures on one side and much cooler air on the opposing side, which can lead to warping of the blade. When warping of the guillotine blade occurs, leaks may be created in the diverter damper that allow hot and toxic gasses pass through to the HRSG and consequently endanger the health of the worker in the HRSG.

What is desired, then, and not found in the prior art, is a gas turbine by-pass system that effectively and securely diverts extremely hot gasses from the HRSG in simple mode to provide workers with the safe environment needed to perform their function within the HRSG, and that can further be operated in an inexpensive mariner.

SUMMARY OF THE INVENTION

It is an object of the present invention to provide a gas turbine by-pass system for use in a gas turbine engine.

It is a further object of the present invention to provide a gas turbine by-pass system having a diverter box that effectively diverts heated gasses from a heat recovering steam generator to allow a worker to service the heat recovering steam generator.

It is yet a further object of the present invention to provide a gas turbine by-pass system having an expansion joint with a truss assembly and a blank off plate that may be moved with a minimal number of workers.

It is another object of the present invention to provide a less expensive gas turbine by-pass system that is reliable and human-safe alternative using a unique monorail/hoist arrangement to handle an expansion joint and a blank off plate without damage and easily replacing flange seals.

The present invention of a gas turbine by-pass system is used between the gas turbine generator outlet nozzle and the inlet of a heat recovery steam generator (HRSG). The gas turbine by-pass system is used to enable a power generation company to switch from producing power in a simple cycle mode (gas turbine generation only) to a combined cycle mode (gas turbine generation and power produced through the HRSG). The gas turbine by-pass system therefore allows the operators to change from combined cycle mode to simple cycle mode to allow maintenance to be performed to the HRSG by crew of human workers.

One embodiment of the gas turbine by-pass system substantially eliminates the need to remove beams and bracing from the stack/silencer support structure. Because weather conditions, such as wind, and other seismic events cannot be predicted, it is crucial that the structure stay intact while the procedure is being effected. The outboard monorail at the outlet end of the diverter "box" and switching track of the monorail make this possible. The entire procedure entails a unique use of monorails, hoists, and the monorail switch track.

Another embodiment of the present design requires removal of some beams and bracing from the support tower in order to remove or replace the blanking plate and the expansion joint. This system may be acceptable for use in areas where the design is governed by wind speed, as it is presumed advance notice of impending wind disturbances (such as hurricanes, tornadoes, thunderstorms, etc.) can be reasonably predicted and the timing of the change-out procedure take place only during "safe" conditions. However, in those geographic areas where seismic activity governs the structural design of the by-pass system, removing beams and bracing could bring a potentially catastrophic situation to bear, since it is almost impossible to predict the timing of seismic activity.

BRIEF DESCRIPTION OF THE DRAWINGS

FIG. 9A is a top plan view of the gas turbine by-pass system of the present invention with the expansion joint being engaged to the motorized electric chain hoists;

FIG. 9B is a front elevational view of the gas turbine by-pass system as illustrated in FIG. 9A;

FIG. 9C is a side elevational view of the gas turbine by-pass system as illustrated in FIG. 9A;

DESCRIPTION OF THE PREFERRED EMBODIMENTS

Figure 1:
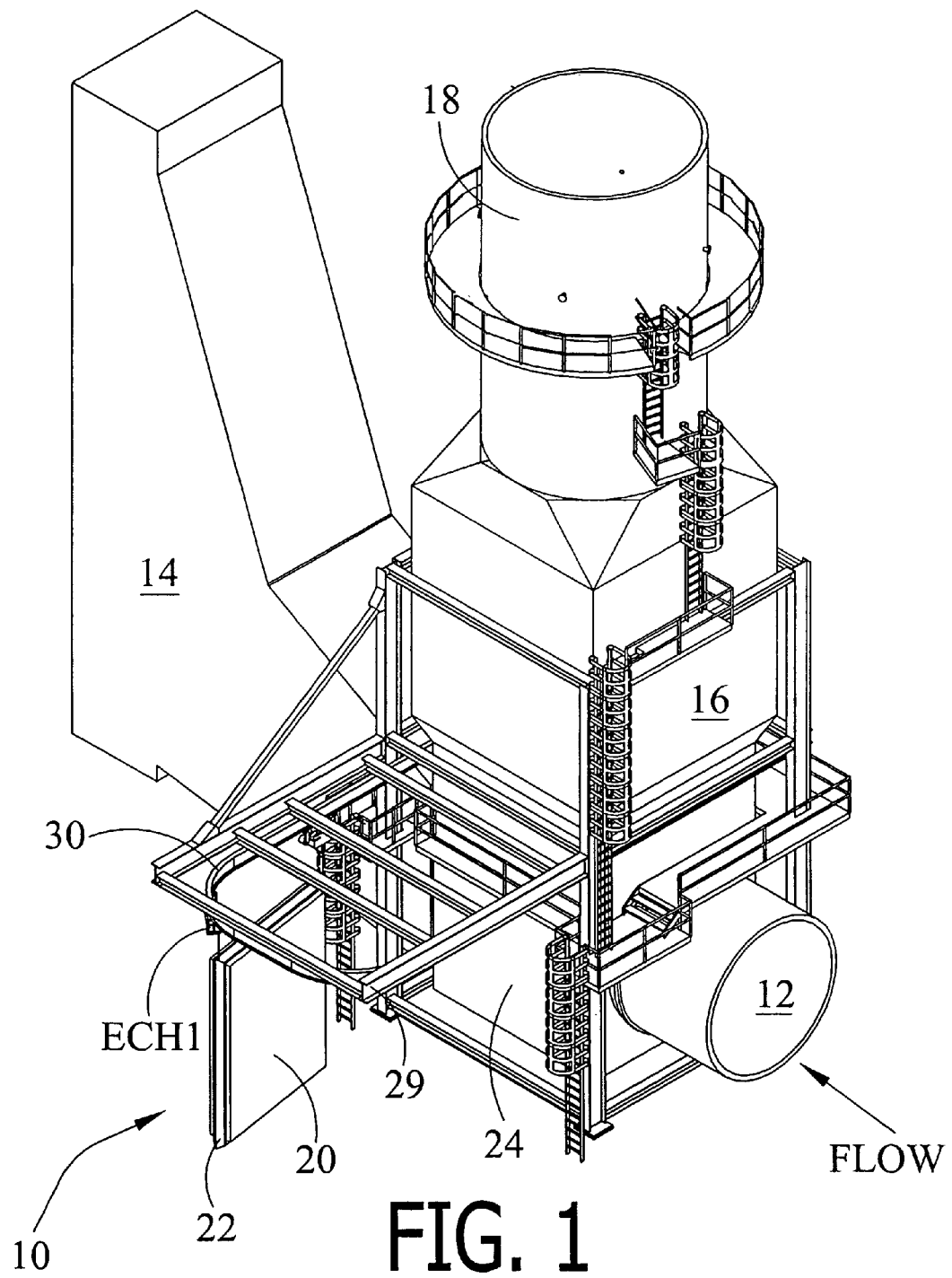
FIG. 1 is a front perspective view of a gas turbine by-pass system of the present invention between a gas turbine outlet nozzle and a heat recovery steam generator.
Figure 2:
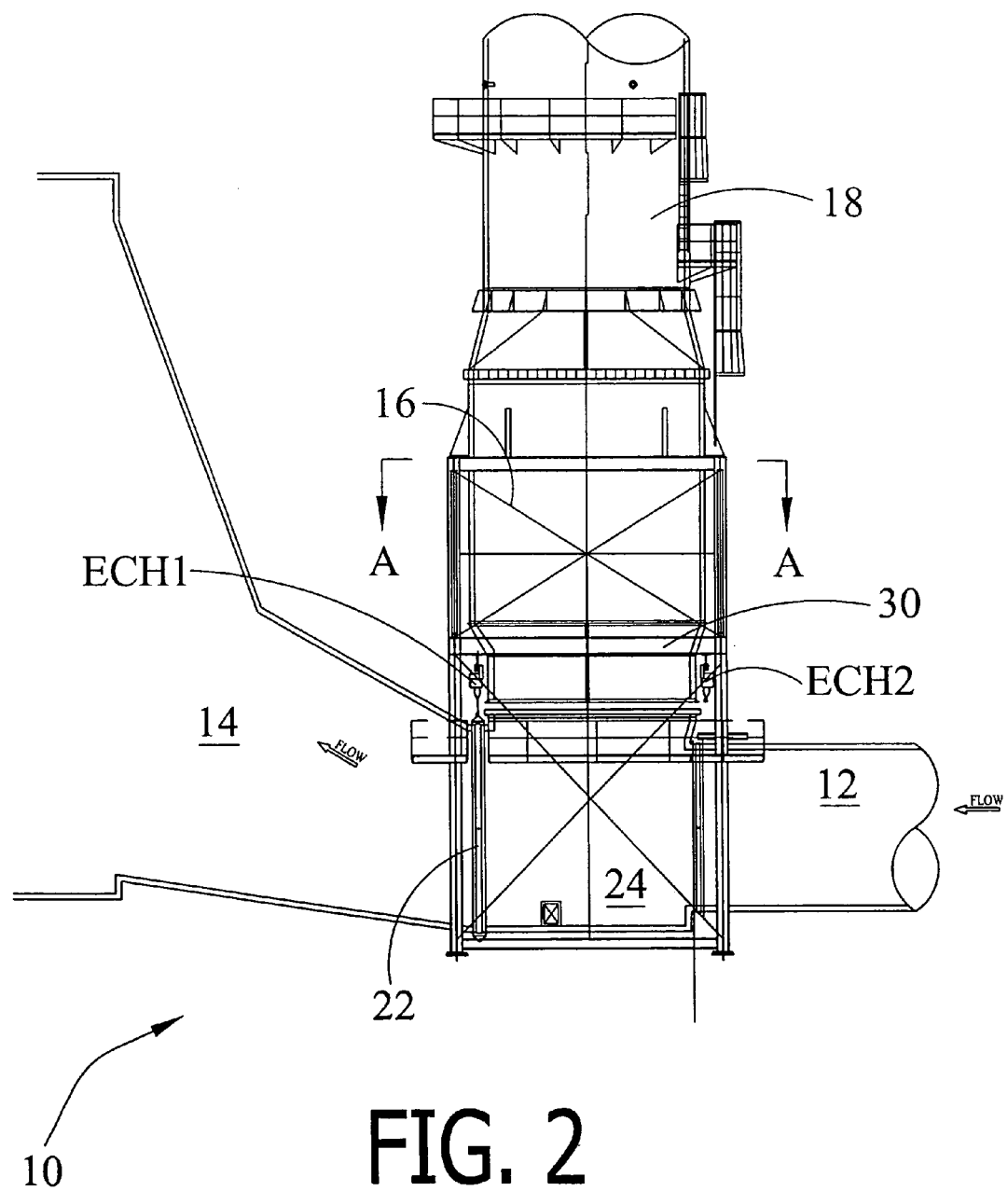
FIG. 2 is a front sectional view of the gas turbine by-pass system of the present invention between the gas turbine outlet nozzle and the heat recovery steam generator.
Figure 3:
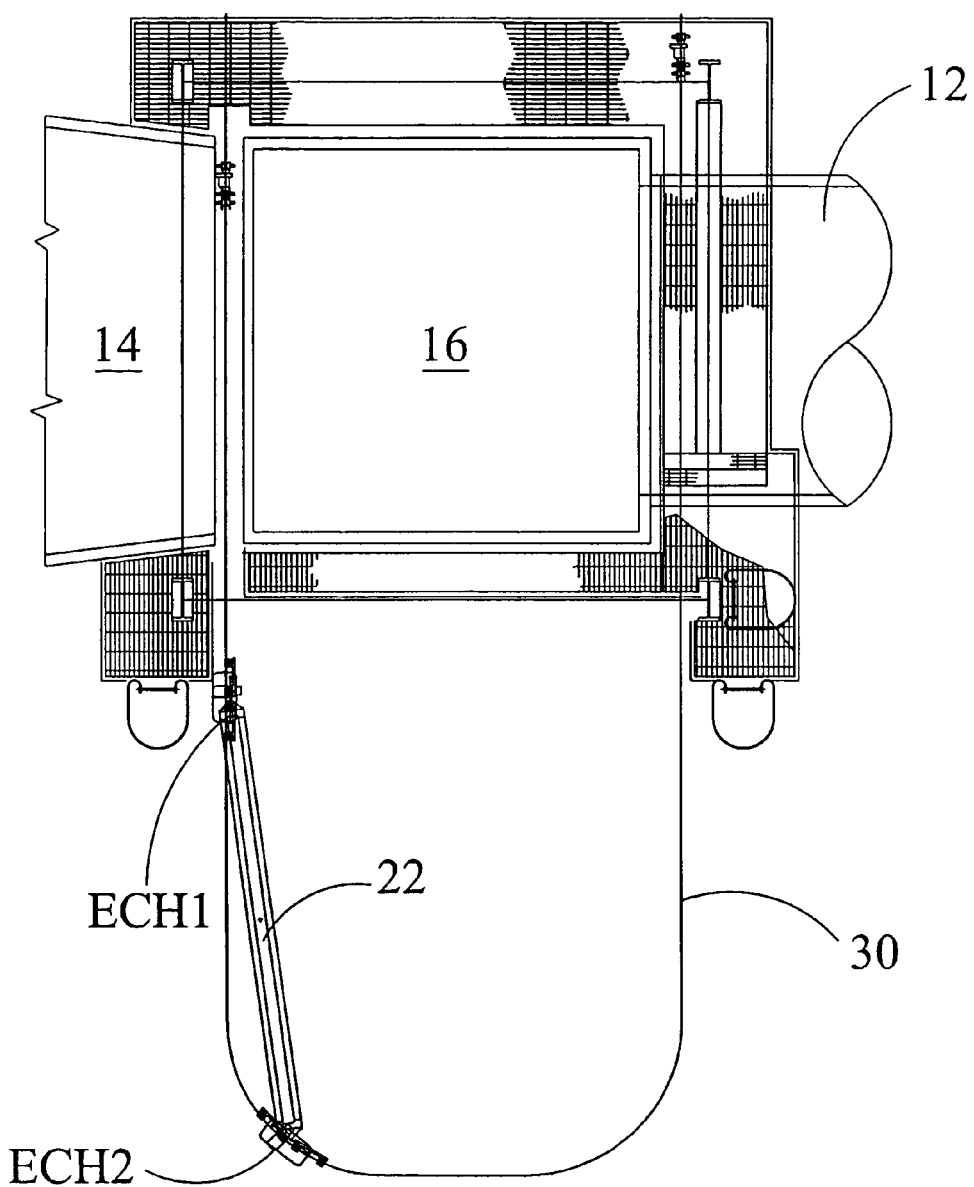
FIG. 3 is a top plan view of the of the gas turbine by-pass system of the present invention between the gas turbine outlet nozzle and the heat recovery steam generator taken along the lines A—A of FIG. 2.

Looking first to FIGS. 1–3, the gas turbine by-pass system 10 of the present invention is illustrated as being incorporated between a gas turbine outlet nozzle 12 and a heat recovery steam generator (HRSG) 14. The gas turbine by-pass system 10 is used during a physical change-out procedure in the HRSG 14 that is performed while the gas turbine (not illustrated) is not in operation. More specifically, the change-out procedure controlled by the gas turbine by-pass system 10 is a procedure to divert gasses from entering the HRSG 14 (called complex mode operation) by directing them through a silencer assembly 16 and a short stack 18 (called simple mode operation). Considering most gas turbine power units are used as "peaking stations", it is quite common to find a window of opportunity to perform the swap of the position of an expansion joint 22 and a blanking or blank off plate 20 without loss of power generation capability during the peak usage hours. Because the expansion joint 22 and blank off plate 20 provide a gas tight fit, the user is assured that any workers inside a HRSG 14 performing maintenance will not be exposed to any risk of hot gas turbine exhaust entering the HRSG 14 enclosure. This advantage is quite significant considering that gas turbine exhaust is typically over 1,000 degrees Fahrenheit, and therefore can pose a substantial threat to any human workers within the HRSG 14 if not totally blocked.

Looking to 11A, the present invention includes a monorail 30 with a series of hoists (two mechanical chain hoists MCH1 and MCH2 and two electric chain hoists ECH1 and ECH2) that are used to transport a blank off plate 20 and an expansion joint 22. The purpose of the expansion joint 22 is to take up slack that is present between the HRSG inlet 14 or the inlet to the by-pass silencer assembly 16 and the diverter box 24. The expansion joint 22 therefore allows these various pieces of equipment to expand at increased temperature without inducing metal stresses upon each other to the point of failure. The expansion joint 22 also isolates the HRSG inlet 14 and diverter box 24 from vibrations that can also be structurally damaging. Typically, fabric type expansion joints 22 cannot be handled without damage to the fabric and separation of the internal insulating pillow (not illustrated), which would create voids allowing high temperature gasses to reach the fabric and carbon steel flanges that cannot withstand the high temperatures. Furthermore, in the case of gas turbine exhaust system expansion joints 22, a light gage stainless steel liner is required also.

The gas turbine by-pass system 10 of the present invention requires removal and relocation of the expansion joint 22 and also the blank off plate 20 from a connection with the diverter box 24. As such, a flexible exoskeleton 26 (see FIGS. 13 and 14) attaches to each flange of the expansion joint 22 and is strong enough to prevent the expansion joint 22 from flexing while it is being moved. The exoskeleton 26 also acts as a "handle" to which the plurality of hoists ECH1, ECH2, MCH1, and MCH2 will attach during the relocation procedure described herein. The exoskeleton 26 includes four separate trusses 27 that support the expansion joint 22 and the blank off plate 20. Once the blank off plate 20 and expansion joint 22 are removed from their fixed positions, the seal pillows may not be reusable due to the ability of the pillow to rebound back to shape (the seal pillows are used as high temperature gaskets).

In effect, the gas turbine by-pass system 10 is designed to control operation between the combined cycle and the simple cycle or by-pass mode. Change-out of the blank off plate 20 will require a crew of three human workers (usually a minimum of three) to perform bolting and unbolting operations. Two of the three workers will be operating the series of monorail hoists (two mechanical chain hoists MCH1 and MCH2 and two electric chain hoists ECH1 and ECH2) during transport of both the blank off plate 20 and expansion joint 22. Tools, ladders, scaffolding, trusses and replacement parts should be staged and ready prior to shutdown of the operating unit. Use of the gas turbine by-pass system 10 includes eight general steps, which are illustrated in FIGS. 4A–4C through 12A–12C, and are as follows: (1) remove the expansion joint 22 from between the diverter box 24 and the HRSG 14; (2) move the expansion joint 22 to storage; (3) remove the blank off plate 20 from storage; (4) inspect and reverse seals and gaskets around the blank-off plate; (5) lower the blank off plate 20 to a vertical position; (6) transfer the blank off plate 20 to the first electric chain hoist ECH1 and the second electric chain hoist ECH2; (7) position the blank off plate 20 in the bypass position; (8) move the expansion joint 22 into the horizontal position; and (9) insert the expansion joint 22 into bypass operating position.

The electrical controllers (not illustrated) for the two electric chain hoists ECH1 and ECH2 may be coiled up and wire tied at each hoist until the time that they are needed. Moreover, the two five-ton electric chain hoists ECH1 and ECH2 are remotely controlled for convenience of operation and to expedite the change-out procedure. For safety reasons, the change out procedure must take place when winds are calm, as the blank off plate 20 presents a large surface area and can easily injure a worker if moved by the wind while suspended from the hoists ECH1, ECH2, MCH1, or MCH2.

Figure 4A:
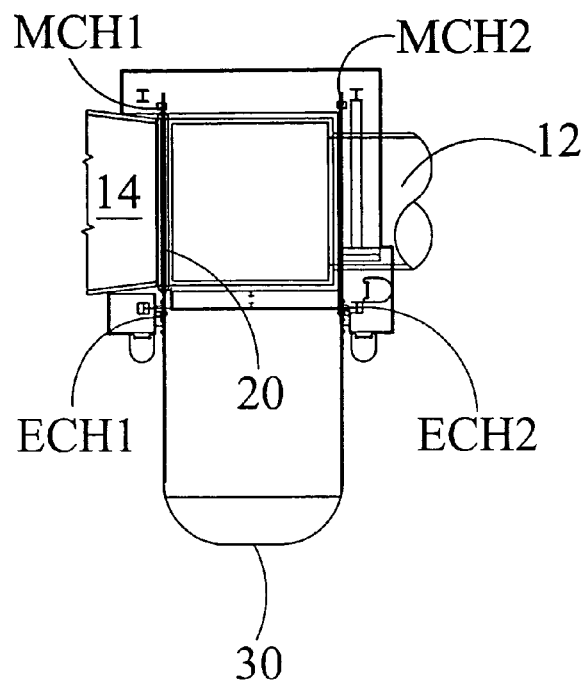
FIG. 4A is a top plan view of the gas turbine by-pass system of the present invention with an expansion joint and blank off plate.
Figure 4B:
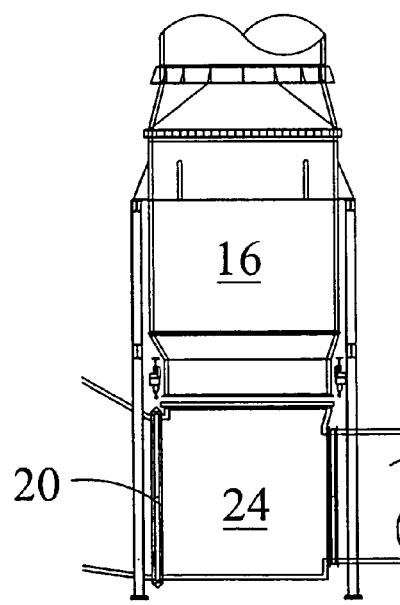
FIG. 4B is a front elevational view of the gas turbine by-pass system as illustrated in FIG. 4A.
Figure 4C:
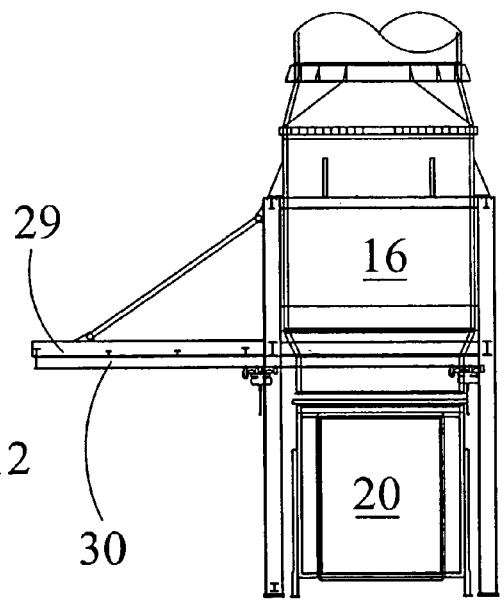
FIG. 4C is a side elevational view of the gas turbine by-pass system as illustrated in FIG. 4A.
Figure 5A:
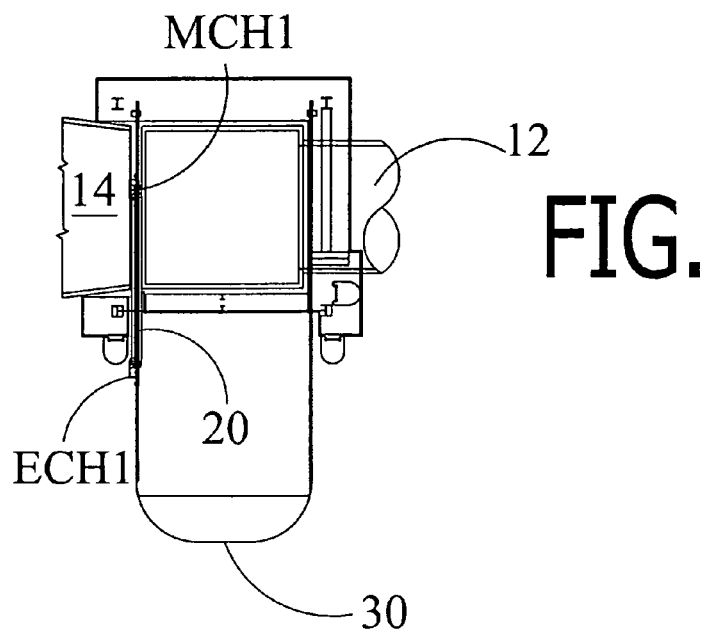
FIG. 5A is a top plan view of the gas turbine by-pass system of the present invention with the expansion joint being moved from combined-cycle mode operation to by-pass mode.
Figure 5B:
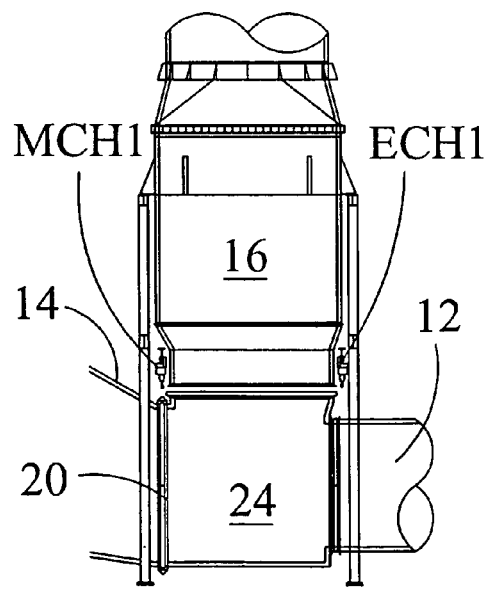
FIG. 5B is a front elevational view of the gas turbine by-pass system as illustrated in FIG. 5A.
Figure 5C:
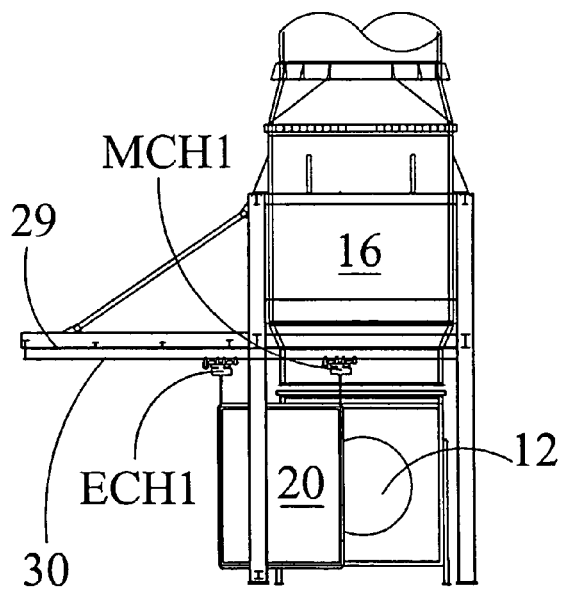
FIG. 5C is a side elevational view of the gas turbine by-pass system as illustrated in FIG. 5A.
Figure 6A:
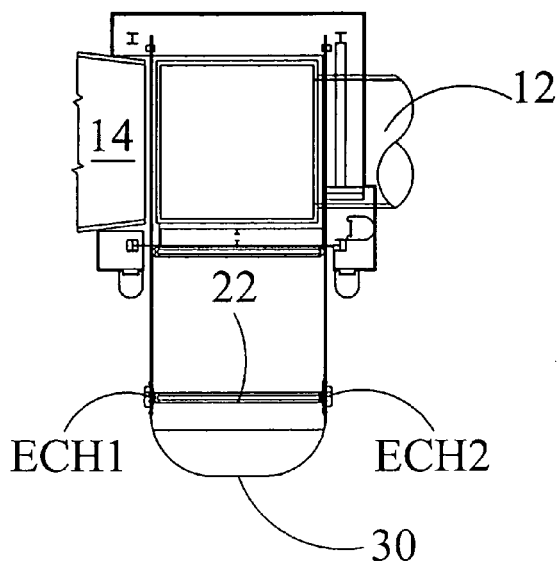
FIG. 6A is a top plan view of the gas turbine by-pass system of the present invention with the expansion joint being moved between combined-cycle mode and temporary storage.
Figure 6B:
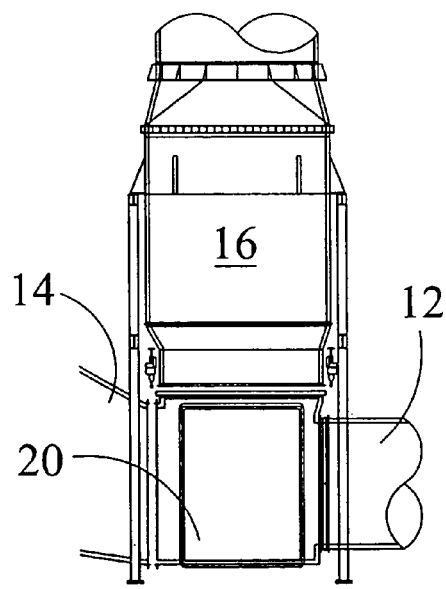
FIG. 6B is a front elevational view of the gas turbine by-pass system as illustrated in FIG. 6A.
Figure 6C:
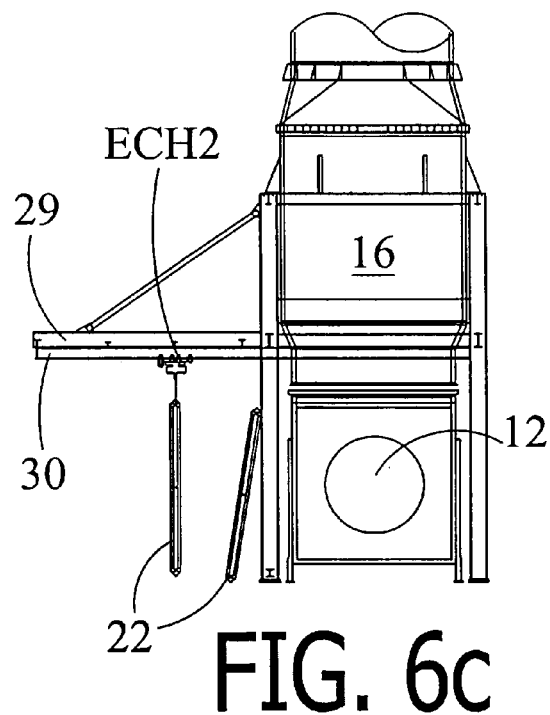
FIG. 6C is a side elevational view of the gas turbine by-pass system as illustrated in FIG. 6A.
Figure 7A:
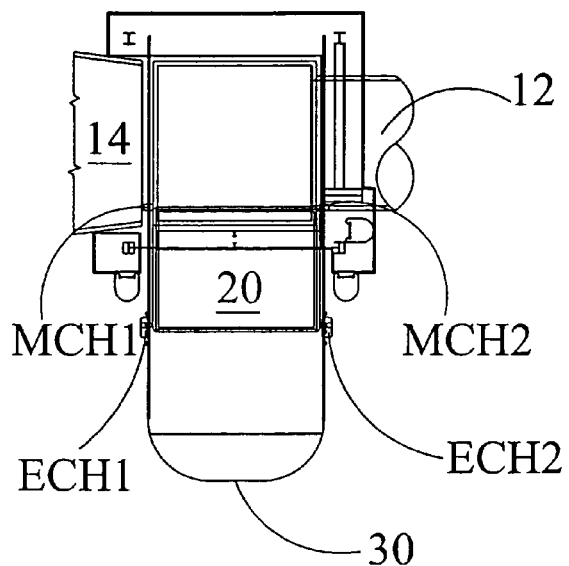
FIG. 7A is a top plan view of the gas turbine by-pass system of the present invention with the hoist being used to move the blank off plate from combined cycle position.
Figures 7B, 7C:
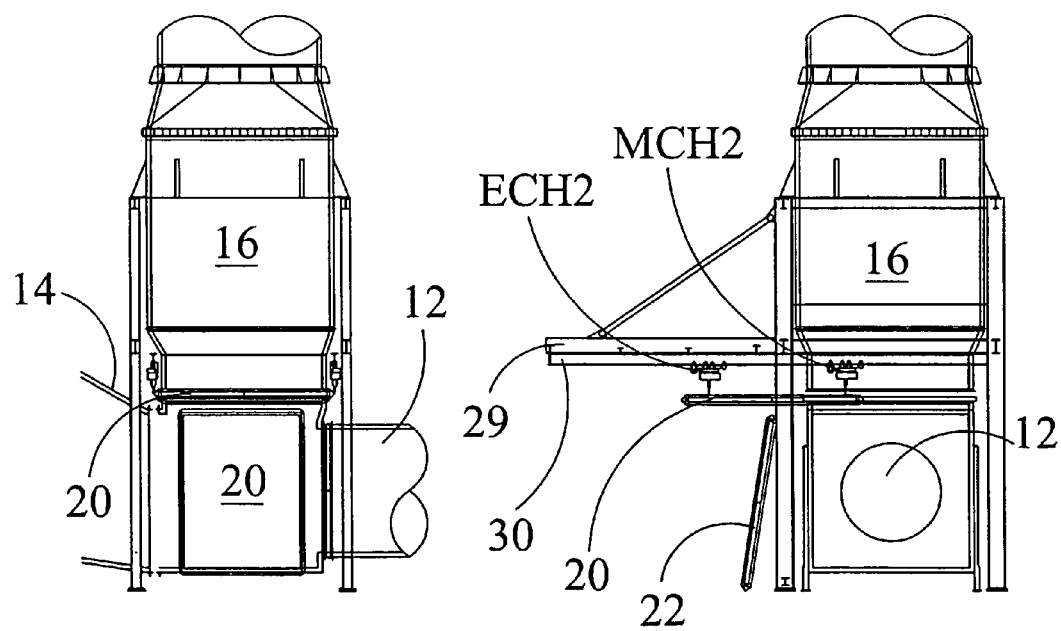
FIG. 7B is a front elevational view of the gas turbine by-pass system as illustrated in FIG. 7A.
FIG. 7C is a side elevational view of the gas turbine by-pass system as illustrated in FIG. 7A.
Figure 8A:
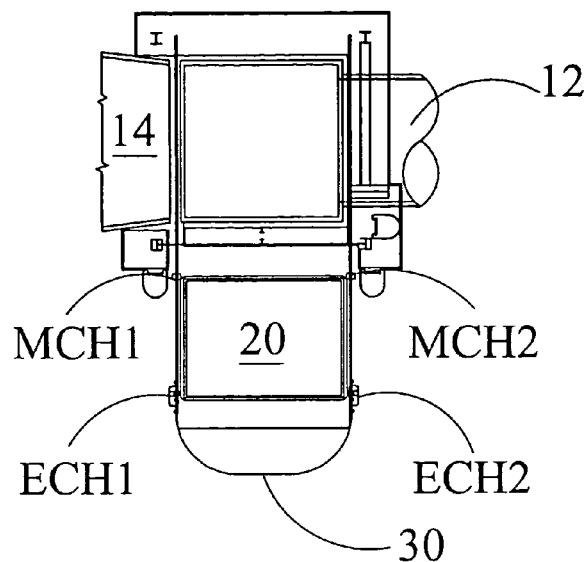
FIG. 8A is a top plan view of the gas turbine by-pass system of the present invention with the blank off plate being positioned vertically by the end hoists.
Figure 8B:
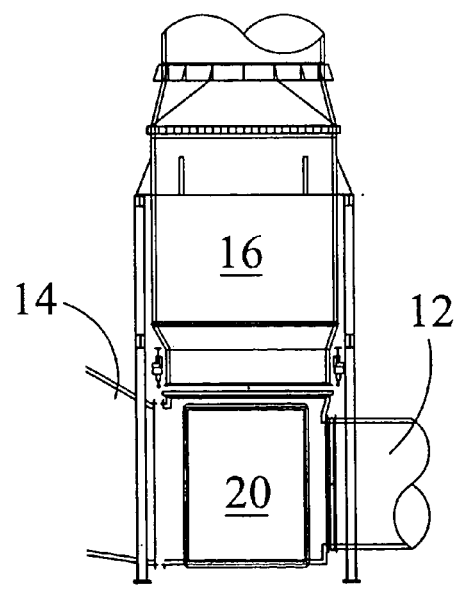
FIG. 8B is a front elevational view of the gas turbine by-pass system as illustrated in FIG. 8A.
Figure 8C:
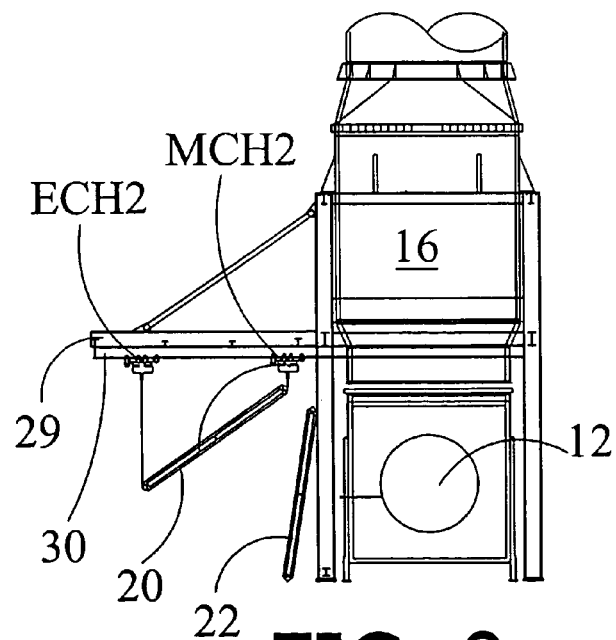
FIG. 8C is a side elevational view of the gas turbine by-pass system as illustrated in FIG. 8A.
Figure 10A:
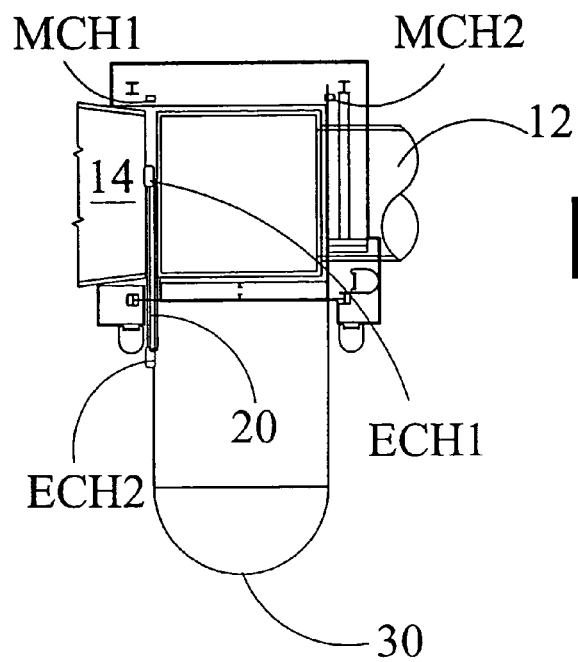
FIG. 10A is a top plan view of the gas turbine by-pass system of the present invention with the blank off plate being inserted into the by-pass mode position using the motorized trolleys.
Figure 10B:
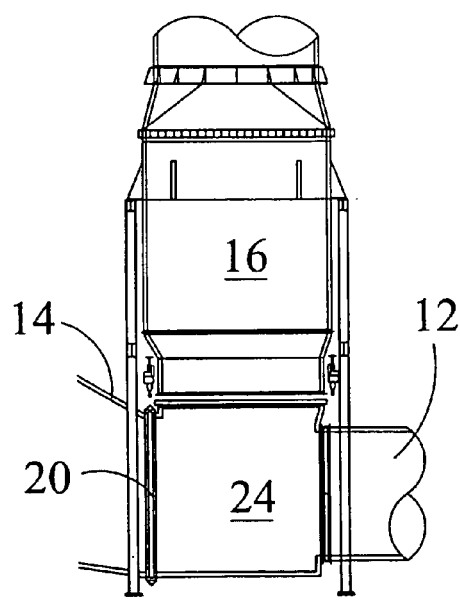
FIG. 10B is a front elevational view of the gas turbine by-pass system as illustrated in FIG. 10A.
Figure 10C:
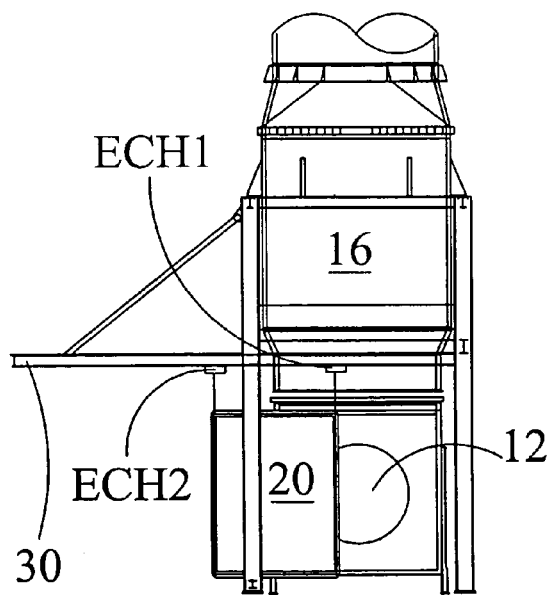
FIG. 10C is a side elevational view of the gas turbine by-pass system as illustrated in FIG. 10A.
Figure 11A:
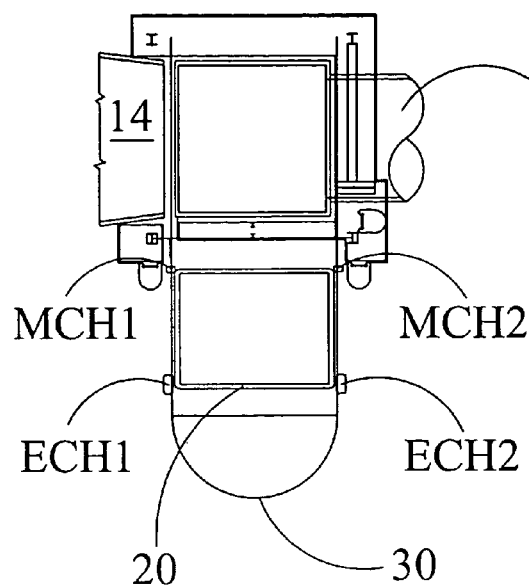
FIG. 11A is a top plan view of the gas turbine by-pass system of the present invention illustrating the stored expansion joint to be positioned for insertion for by-pass operation.
Figures 11B, 11C:
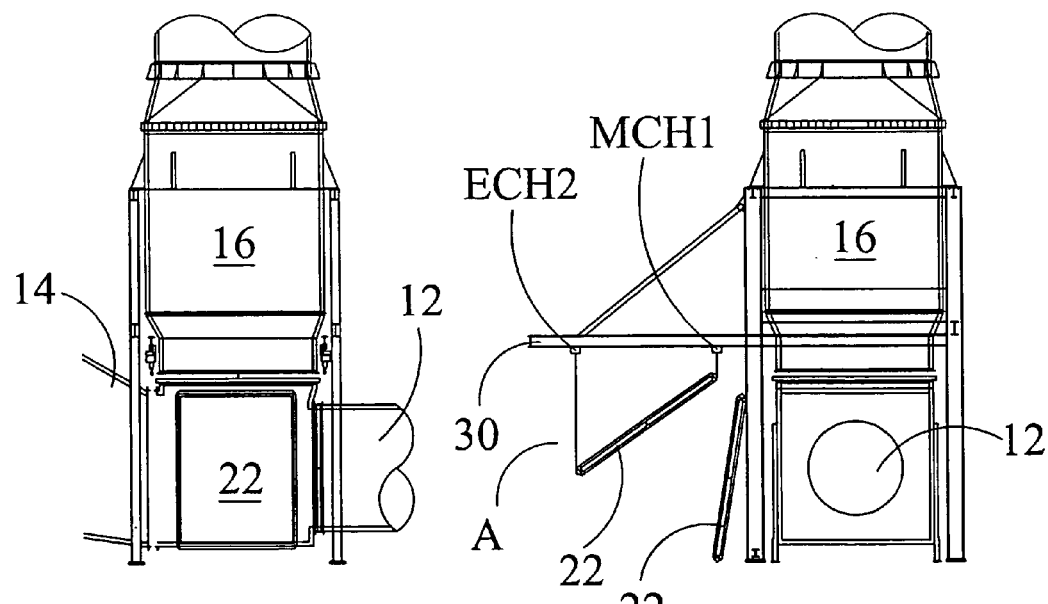
FIG. 11B is a front elevational view of the gas turbine by-pass system as illustrated in FIG. 11A.
FIG. 11C is a side elevational view of the gas turbine by-pass system as illustrated in FIG. 11A.
Figure 12A:
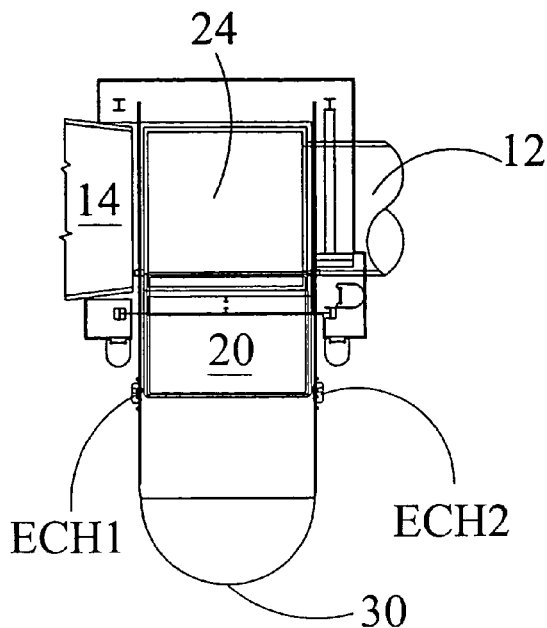
FIG. 12A is a top plan view of the gas turbine bypass system.
Figures 12B, 12C:
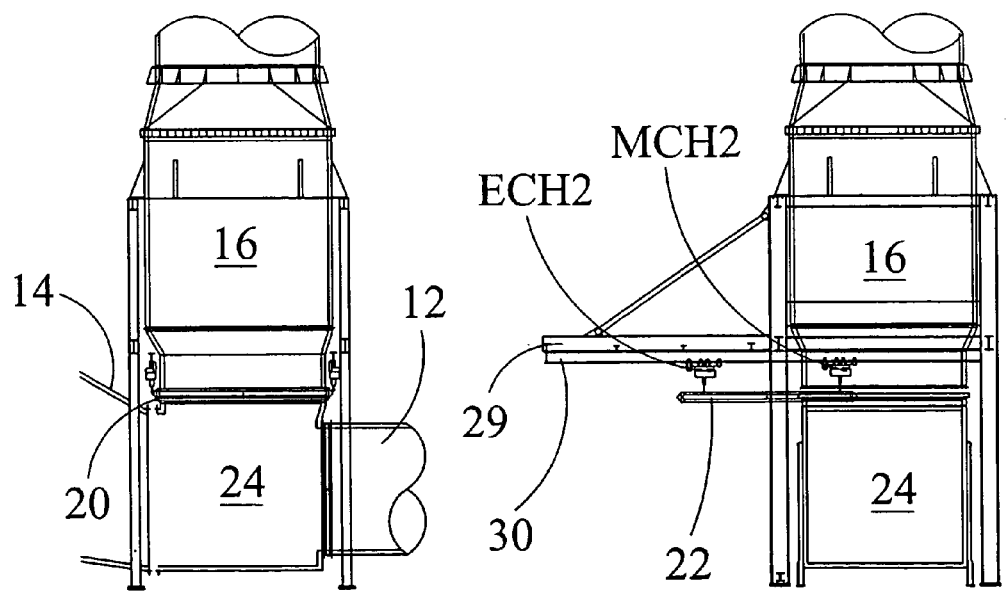
FIG. 12B is a front elevational view of the gas turbine by-pass system as illustrated in FIG. 12A.
FIG. 12C is a side elevational view of the gas turbine by-pass system as illustrated in FIG. 12A.
Figure 13:
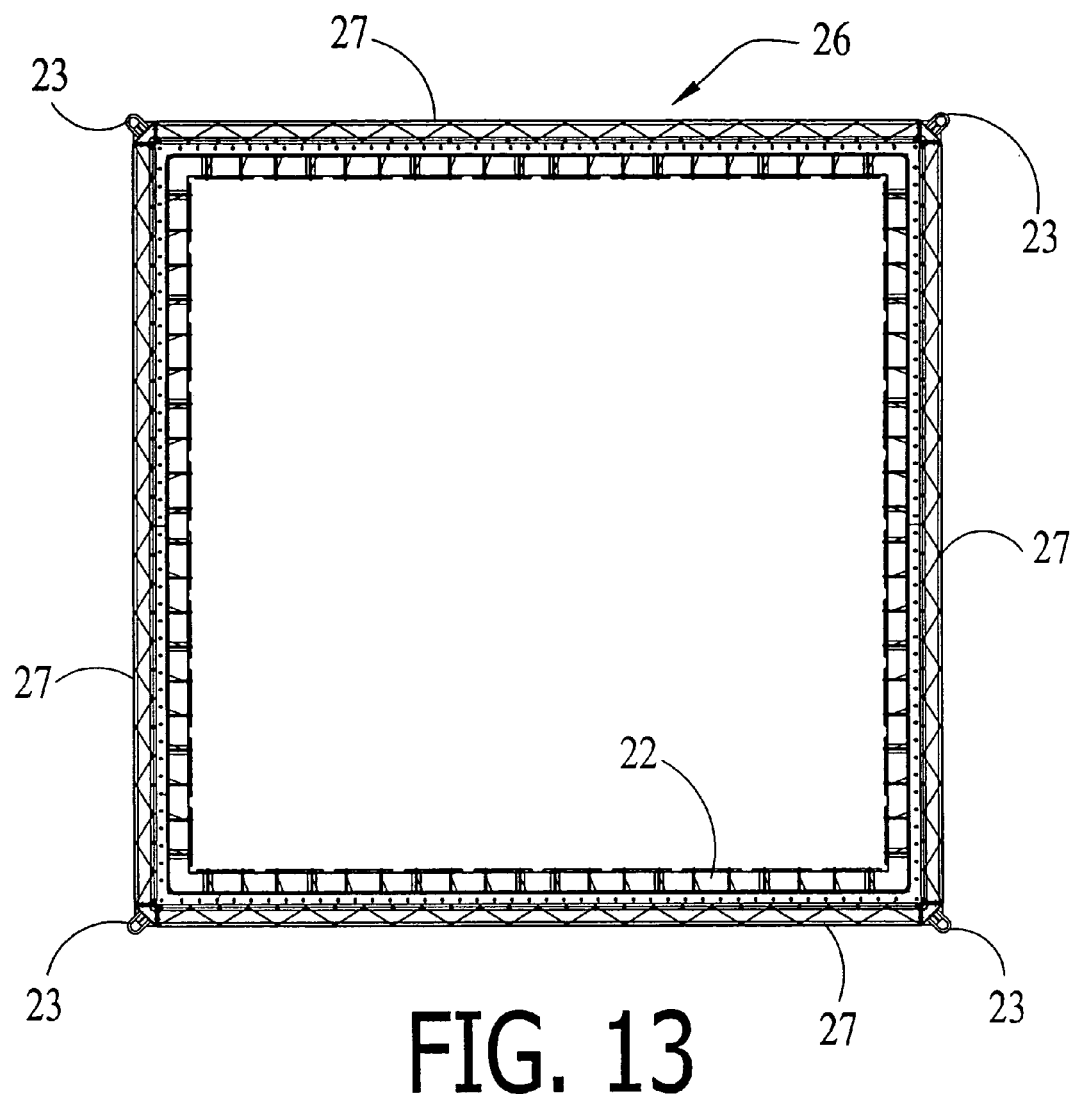
FIG. 13 is a top plan view of an expansion joint, which is further surrounded by an exoskeleton.
Figure 14:
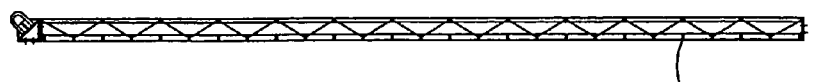
FIG. 14 is an end view of the exoskeleton, this view showing one of four trusses used to form the exoskeleton.
Figure 15:
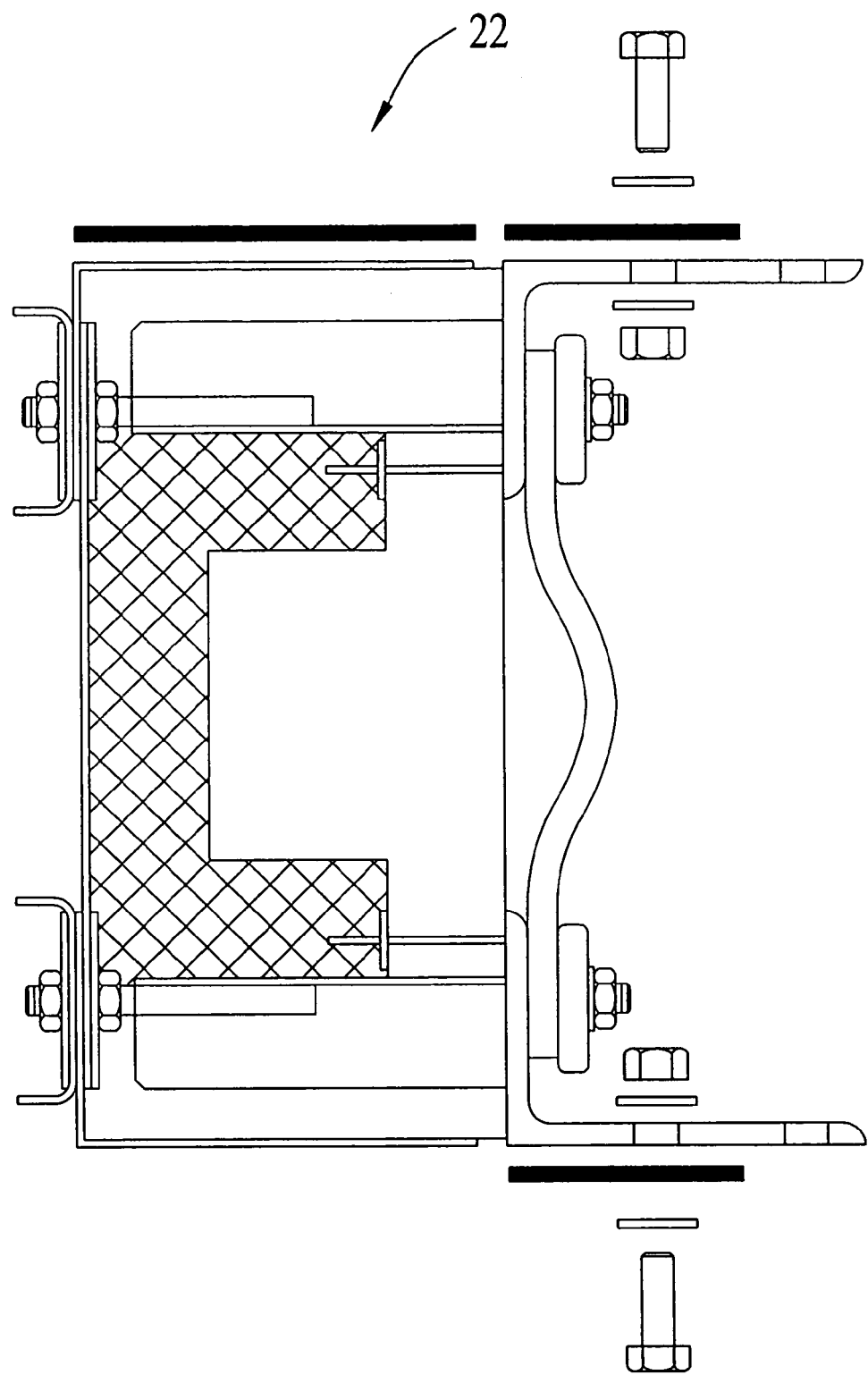
FIG. 15 is a sectional view through the expansion joint showing the outer fabric/flexible cover at the internal insulation and liner plate which prevents heat transfer to the outside.
Figure 16:
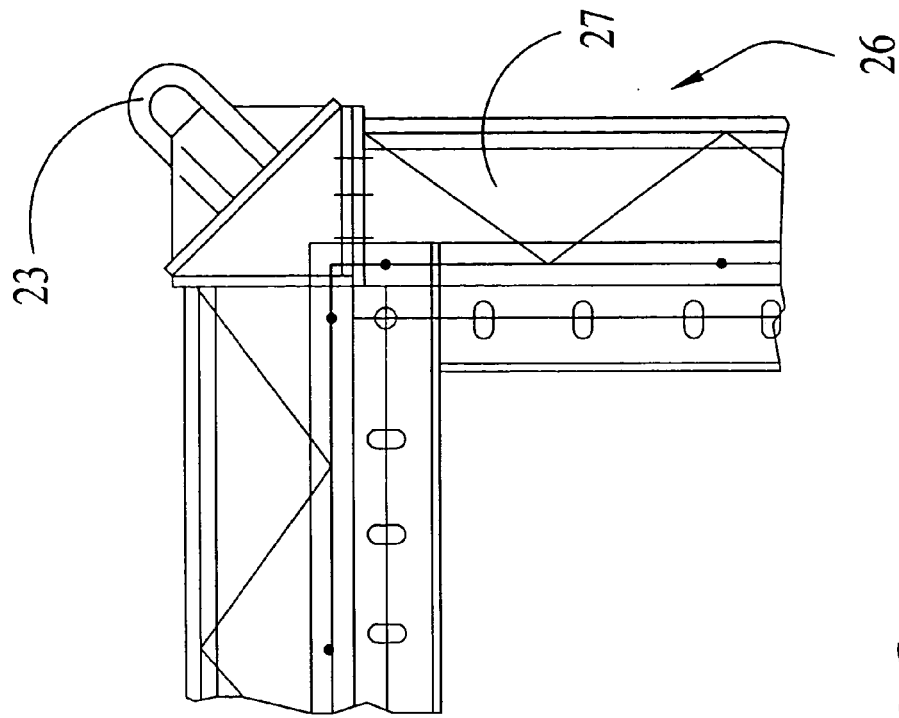
FIG. 16 is a sectional view of the expansion joint and exoskeleton further illustrating the connecting lugs, the exoskeleton allowing transport of the expansion joint by the trolleys/hoists without damaging the fabric cover or displacing the insulation.
Figure 16:
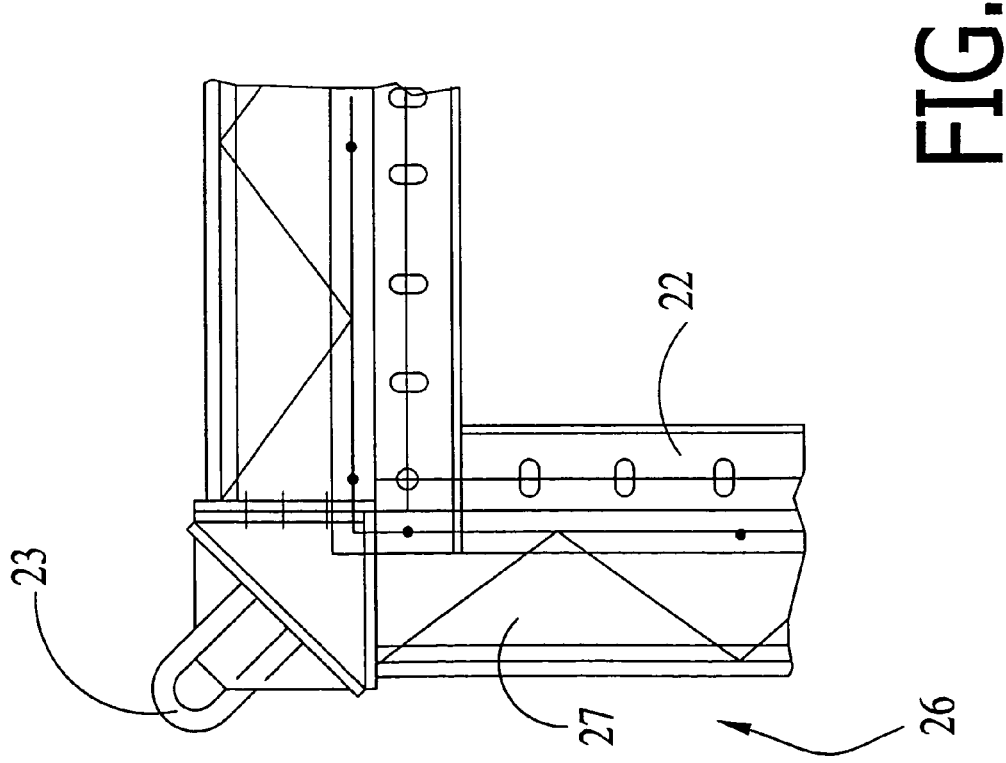

Orientation of the assembly is provided in FIG. 4A, wherein the two electric chain hoists ECH1 and ECH2 are the primary means of moving both the blank off plate 20 and the expansion joints 22. The two five-ton manual chain hoists MCH1 and MCH2 are additionally used to supplement the electric chain hoists ECH1 and ECH2 in holding the blank off plate 20 and expansion joints 22. A set of lugs 23 (see FIG. 13) are attached to the expansion joint 22 and the blank off plate 20 at requisite points for lifting purposes by the hoists ECH1, ECH2, MCH1, and MCH2. Referring to FIG. 13, the expansion joint 22 has the external temporary exoskeleton 26 that is used to stiffen the joint during handling. The exoskeleton 26 is made up of four trusses 27 that will be unbolted and stored when not in use. Prior to change-out of the blank off plate 20 and expansion joints 22, the exoskeleton 26 will be installed and bolted around the perimeter of the diverter box side of the expansion joints 22. During change-out, the expansion joint 22 will be compressed and bolted to the exoskeleton 26. This will form a rigid frame for moving the expansion joint 22 without damaging the expansion joint 22.

Following the steps identified above, the first step of the change-out procedure to transition from the combined cycle operation to the simple cycle operation (or bypass mode) is to obtain the expansion joint 22 from the combined cycle position (between the HRSG inlet 14 and the diverter box 24 outlet). The workers will move manual chain hoist MCH1 to the end of the monorail 30, and then position the first electric chain hoist ECH1 near the pick-up lug 23 of the expansion joint 22. The second electric chain hoist ECH2 is then moved to the position formerly occupied by the first electric chain hoist ECH1 above the expansion joint's second pick-up lug 23. With the hoist chains of electric chain hoists ECH1 and ECH2 extended and attached to the lugs 23 of the expansion joint 22, the slack is taken out of the hoist chains to absorb the weight of the expansion joint 22.

Using electric or pneumatic impact wrenches (not illustrated), the workers will unbolt the corner bolts that attach the expansion joint 22 between the diverter box 24 and the HRSG 14 unit. Once removed, four special threaded rods (not illustrated) are installed through the empty apertures for use in guiding the expansion joint 22.

The workers are then required to unbolt the expansion joint 22 from the HRSG inlet duct 14. Bolts along the bottom of the expansion joint 22 can be accessed from the ground; a ladder and platform will provide access to the upper side of the expansion joint 22. Due to the slope and position of the HRSG inlet duct 14, work must take place on top of the HRSG inlet duct 14. While the workers are in this area, the bolts on the adjacent side of the blank off plate 20 should also be removed. Bolts on the side flanges of the expansion joint 22 can be reached from ladders or by setting up scaffolding.

Once the expansion joint 22 is completely unbolted from the HRSG duct 14, it can be compressed using threaded rods and nuts until the loosened flange mates with the exoskeleton 26. Once in contact with the exoskeleton 26, the expansion joint 22 is secured with the exoskeleton 26. The workers can now unbolt the expansion joint 22 on all four sides proximate the diverter box 24.

The expansion joint 22 is now free to be moved. The expansion joint 22 is separated from the flange of the diverter box 24 and the four corner threaded rods are removed. Consequently, the workers can transition to step 2, wherein the expansion joint 22 is moved to storage. Approximately two crew members will be needed to operate the controls for the electric chain hoists ECH1 and ECH2 to transport the expansion joint 22 slowly along the trolley monorail 30 from between the outlet flange of the diverter box 24 and the HRSG inlet duct 14. The second electric chain hoist ECH2 will travel around the curved monorail 30 until the expansion joint 22 is positioned parallel with the direction of flow of the gas. Both electric chain hoists ECH1 and ECH2 are then activated to move the expansion joint 22 into its storage position next to the east side platform. The expansion joint 22 is then lowered to the ground for storage purposes. The hoist chains ECH1 and ECH2 are then disconnected from the expansion joint 22 after it is securely stored.

The third step is to remove the blank off plate 20 from the stored position. To do so, electric chain hoists ECH1 and ECH2 are moved to a position proximate the inboard lifting lugs 23 of the blank off plate 20, and manual chain hoists MCH1 and MCH2 are moved to a position proximate the outboard lifting lugs 23. By now, the third worker should have all remaining bolts removed from the blank off plate 20. These flanges are accessible by fixed ladders and platforms. After completing the unbolting, manual chain hoists MCH1 and MCH2 and electric chain hoists ECH1 and ECH2 are positioned near the respective pick-up points of blank off plate 20 and their chains are attached to the respective lifting lugs 23. Manual chain hoists MCH1 and MCH2 are manually operated by two workers to lift the blank off plate 20 upward, and one person using the two controls lifting simultaneously electrically operates electric chain hoists ECH1 and ECH2.

When sufficient clearance above the flange of the diverter box 24 is achieved, two workers return to grade and, using the controls for electric chain hoists ECH1 and ECH2, gradually move the blank off plate 20 horizontally outward until it just clears the diverter platform 24 on the east side. The movement of the blank off plate 20 is stopped before electric chain hoists ECH1 and ECH2 reach the curved part of the monorail 30 to avoid damage to the electric chain hoists ECH1 and ECH2.

The workers then inspect and reverse the seals and gaskets (not illustrated). Because the blank off plate 20 requires a special folding pillow seal, the pillows in the top and side of the diverter box 24 must now be reversed. The workers remove the ceramic fiber sealing pillows from the top of the diverter box 24 and the pillows from the side of the diverter box 24. Once the pillows are removed, they are inspected for any wear, damage or over-compression, because any pillow showing such damage or wear will not provide adequate sealing when it is reinstalled. The pillows are then reversed, wherein the diverter top pillow is installed in the side of the diverter box 24 and the side pillow is installed in the top of the diverter box 24. All flange gaskets are removed and discarded. New flange gaskets are then installed using adhesive cement or bolts to hold gaskets in place until components can be reinstalled in duct.

The fifth step in this process is to lower the blank off plate 20 to a vertical position, all the while making sure that the blank off plate 20 does not hit or damage the expansion joint 22. The blank off plate 20 is still in the horizontal plain extended just beyond the diverter box 24. To lower the blank off plate 20 to the vertical position, electric chain hoists ECH1 and ECH2 are slowly activated simultaneously to evenly lower the outboard end of the blank off plate 20 until it is in the vertical position. At such point, manual chain hoists MCH1 and MCH2 will hold the entire load of the blank off plate 20.

Next, the blank off plate 20 is transferred to electric chain hoists ECH1 and ECH2. More specifically, the connections with electric chain hoists ECH1 and ECH2 are released and the electric chain hoists ECH1 and ECH2 are returned to the closest point possible next to the manual chain hoists MCH1 and MCH2. The hoists from electric chain hoists ECH1 and ECH2 are attached to the same lift points now occupied by manual chain hoists MCH1 and MCH2 to transfer the load from the manual chain hoists MCH1 and MCH2 to the electric chain hoists ECH1 and ECH2. The manual chain hoists MCH1 and MCH2 are disconnected from the blank off plate 20 and the blank off plate 20 is ready to be moved into the gap vacated by the expansion joint 22.

The seventh step requires that the blank off plate 20 be positioned in the bypass position. Using the electric chain hoists ECH1 and ECH2, the two workers at grade, in a coordinated manner, move the blank off plate 20 to a position perpendicular to the direction of the gas flow, with the blank off plate liner facing toward the gas turbine 12. For such movement, the electric chain hoist ECH2 must move around the curve of the monorail 30. The electric chain hoists ECH1 and ECH2 are used to power the blank off plate 20 into position while being guided by all three workers in order to prevent damage to the flange gaskets and the liner of the blank off plate 20. The liner of the blank off plate 20 must not contact duct flange while being moved into position or damage could result.

Once the blank off plate 20 is in position, all four special threaded rods are installed through the corner holes of the flange of the diverter box 24, blank off plate 20 and HRSG inlet duct 14. These rods are used to guide the blank off plate 20 into the HRSG inlet duct 14. Using threaded rods, the blank off plate 20 is pulled against the flange of the diverter outlet 24. The blank off plate 20 must be centered in the opening of the HRSG inlet duct 14 when being inserted. When the distance is such that the remaining bolts can be inserted, each third bolt in the flange is installed and tightened snug and the special threaded rods are then removed. The electric chain hoists ECH1 and ECH2 are detached and the remaining bolts installed, and all bolts properly torqued and flat washers are used on both sides of the connection for proper seal.

Manual chain hoist MCH1 and MCH2 are next attached to the expansion joint lifting lugs 23 at the top of the expansion joint 22 (as it is stored vertically), and the cables are tightened to pick up the expansion joint 22 slightly. With the electric chain hoists ECH1 and ECH2 positioned near manual chain hoists MCH1 and MCH2, the chains are lowered to the bottom flange lifting lugs 23 on the expansion joint 22. The chains are then drawn simultaneously traversing the trolleys of electric chain hoists ECH1 and ECH2 outward on the monorail, thereby bring the lower end of the expansion joint 22 into the horizontal plain at the same elevation as the upper end.

The expansion joint 22 is then inserted into bypass operating position using electric chain hoist ECH1 and ECH2. The expansion joint 22 is pushed toward the stack. The electric chain hoists ECH1 and ECH2 are used to adjust the height of the expansion joint 22, thereby insuring that the expansion joint will clear the flanges of the diverter box 24 and the bottom transition of the silencer assembly 16. When the expansion joint 22 is properly aligned with the top flange of the diverter box 24 and lower pillows and gaskets are in place, the expansion joint 22 can be carefully lowered into position using the corner flange bolts as final guides. The electric chain hoists ECH1 and ECH2 are released when the expansion joint 22 is lowered to rest on the flange of the diverter box 24.

As two workers fasten the expansion joint bolts to the flange of the diverter box 24, the third worker will remove the bolts holding the moveable end of the exoskeleton 26 and install the flashing and flange gaskets on top of the expansion joint 22. When the exoskeleton frame bolts are removed, the threaded rods are used to pull the expansion joint 22 until the upper flange contacts the bottom transition flange. The flange bolts are then inserted and properly torqued, with the flat washers on both sides of the connection. At this point, the gas turbine bypass system 10 is now ready to go back on line, and the trusses are removed from the expansion joint.

As is clear from the description above, this gas turbine by-pass system 10 allows a minimal number of workers to complete a complicated task in a minimal amount of time. Consequently, this design provides time benefits not seen in other designs, which further leads to monetary benefits since downtime is reduced and also the number of worker injuries are reduced.

The original design requires removal of some beams and bracing from the support tower in order to remove or replace the blanking plate 22 and the expansion joint 22. This system may be acceptable for use in areas where the design is governed by wind speed, as it is presumed advance notice of impending wind disturbances (such as hurricanes, tornadoes, thunderstorms, etc.) can be reasonably predicted and the timing of the change-out procedure take place only during "safe" conditions. However, in those geographic areas where seismic activity governs the structural design of the gas turbine by-pass system 10, removing beams and bracing could bring a potentially catastrophic situation to bear, since it is almost impossible to predict the timing of seismic activity.

Figure 17:
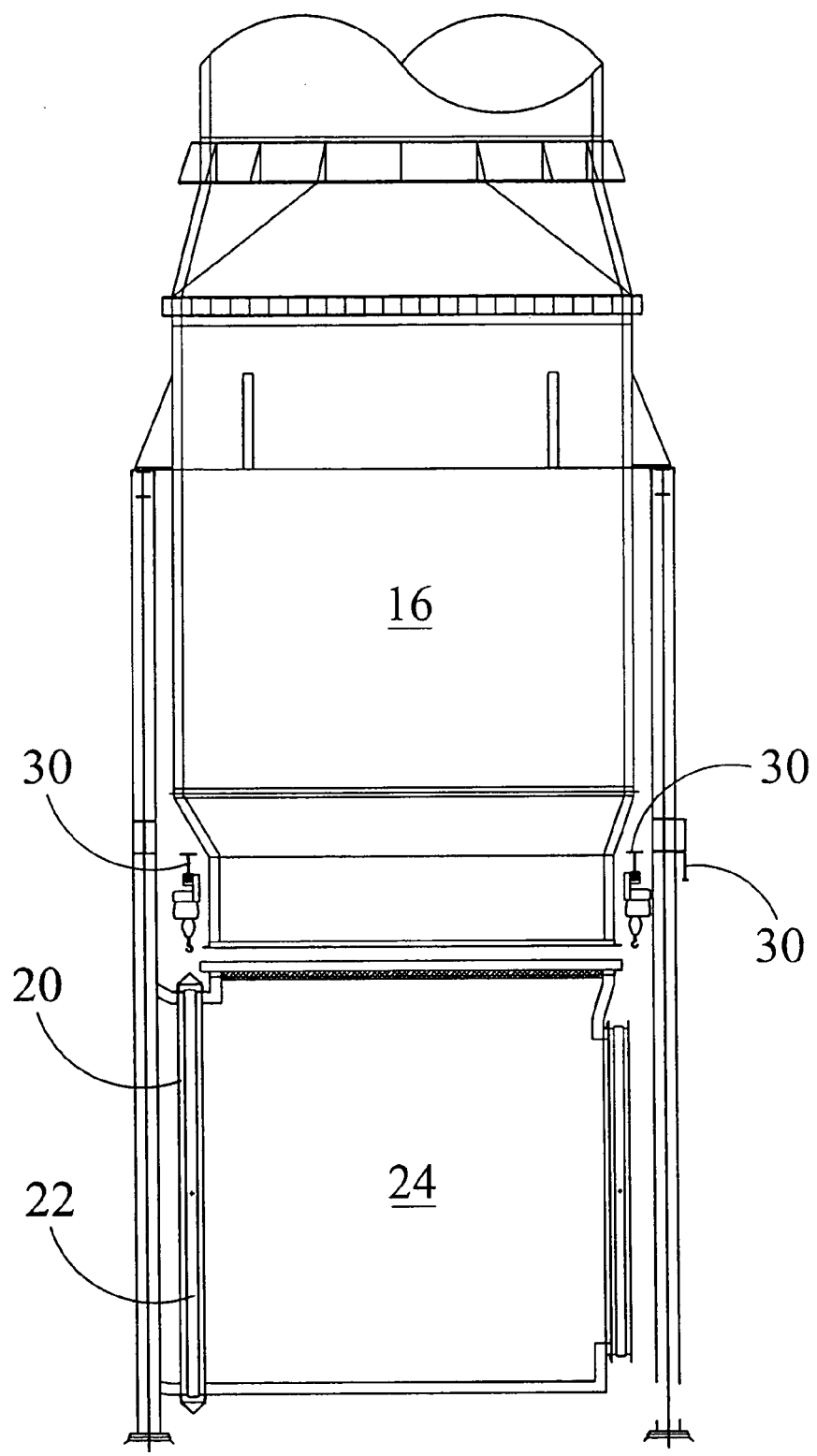
FIG. 17 is a side elevational view of a second embodiment of the gas turbine by-pass system having an inboard monorail and an outboard monorail.
Figure 18:
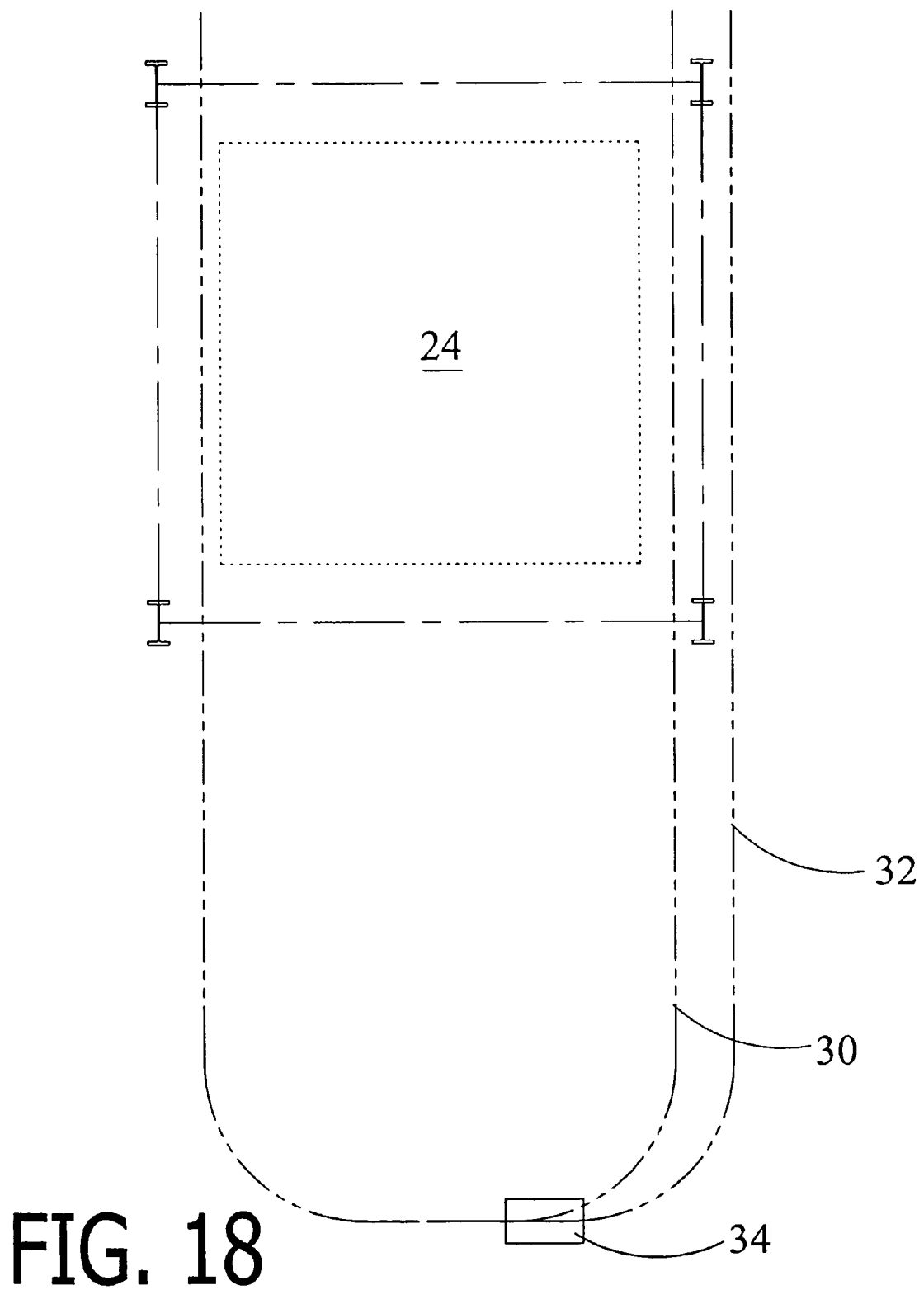
FIG. 18 is a top sectional view of the second embodiment of the present invention as illustrated in FIG. 17.
Figure 19:
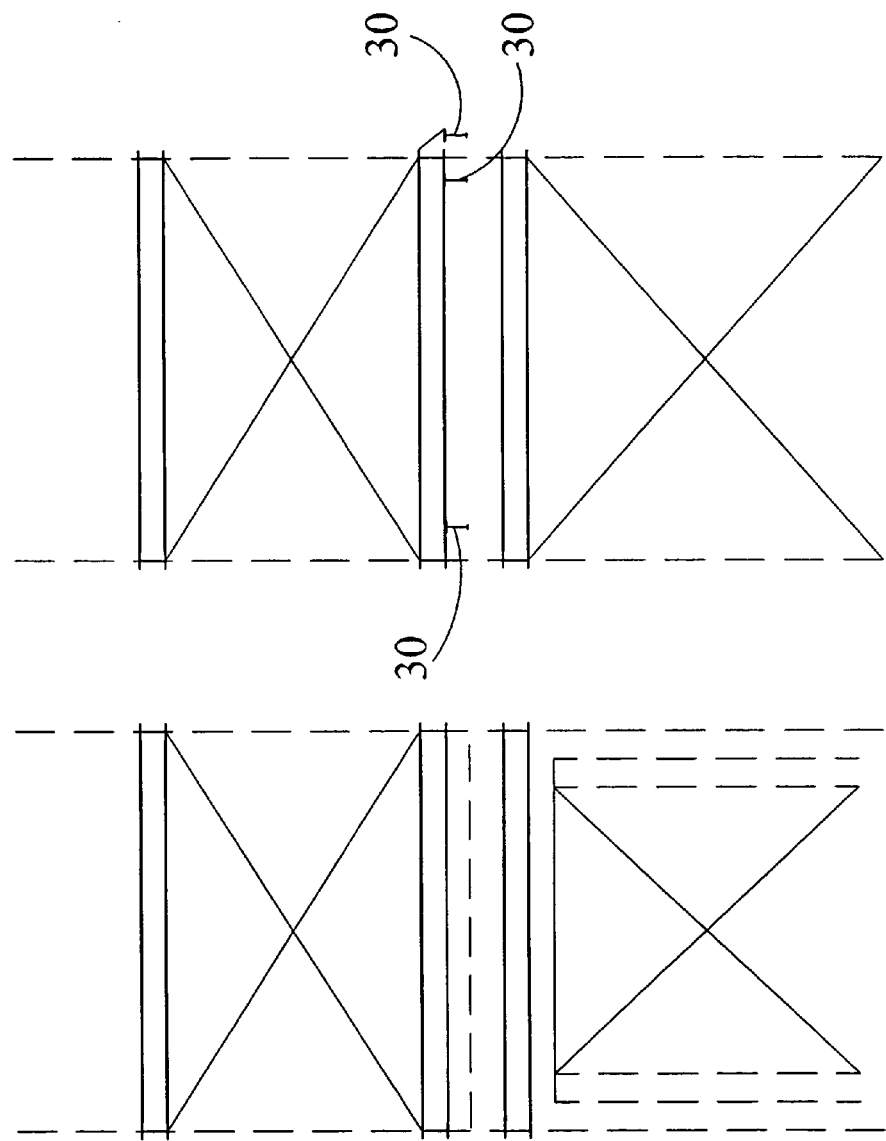
FIG. 19 is a front elevational view of the second embodiment of the present invention as illustrated in FIG. 17.
Figure 20:
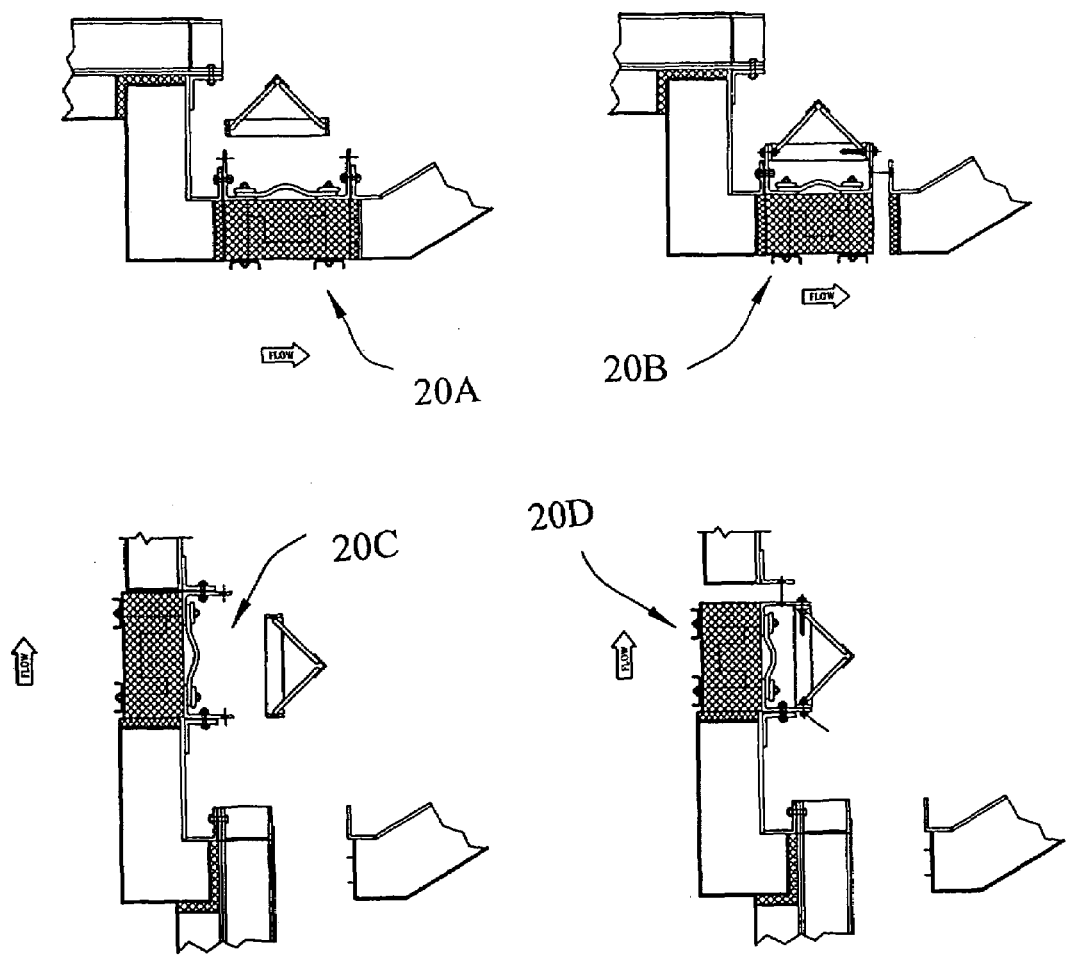
FIG. 20A is a cut away view of FIG. 2 along line A—A in combined cycle mode with the expansion joint extended.
FIG. 20B is a cut away view of FIG. 2 along line A—A in combined cycle mode with the expansion joint compressed.
FIG. 20C is a cut away view of FIG. 2 along line A—A in bypass mode with the expansion joint extended.
FIG. 20D is a cut away view of FIG. 2 along line A—A in bypass mode with the expansion joint compressed.

This optional design utilizes the basic procedure to effect the change out of the components, with the changes illustrated in FIGS. 17–19. Such a design eliminates the risk of a structurally compromised tower by adding an outboard monorail 32 and an extension to the diverter box outlet 24. This brings the horizontal portion of the change-out procedure outside the structural tower, eliminating the need to remove the aforementioned beams and bracing.

The outlet end of the diverter box 24 is extended beyond the support column lines. At this point, the blank off plate 20 is positioned for simple cycle operation, or the expansion joint 22 is located here for combined cycle operation. The outboard monorail 32 is added to the gas turbine by-pass system 10 just above the extended outlet flange of the diverter box 24. This is used to move the appropriate part (either the blank off plate 20 or the expansion joint 22) into the horizontal position. In addition to the outboard monorail 32, a switch track 34 is attached to the inboard monorail 30 and outboard monorail 32. By activating the appropriate switch, the powered trolleys and hoists are allowed to travel both the inboard monorail 30 and the outboard monorail 32 in order to complete the change out.

Thus, although there have been described particular embodiments of the present invention of a new and useful GAS TURBINE BY-PASS SYSTEM, it is not intended that such references be construed as limitations upon the scope of this invention except as set forth in the following claims.

We claim:

1. A method for switching power production between a simple cycle mode and a combined cycle mode, said method comprising the steps of:
   a) removing an expansion joint from between a diverter box and a heat recovery steam generator using a conveyor;
   b) storing said expansion joint;
   c) transporting said blanking plate into position between said diverter box and said heat recovery steam generator using said conveyor; and
   d) affixing said blanking plate between said diverter box and said heat recovery steam generator to divert gasses from said heat recovery steam generator into a gas turbine exhaust stack.

2. The method as described in claim 1 wherein, after step a), further including the step of:
   attaching said expansion joint to an exoskeleton; and
   moving said expansion joint and said exoskeleton proximate said diverter box.

3. The method as described in claim 1 wherein step c) further comprises:
   rotating said blanking plate into a vertical storage position.

4. The method as described in claim 1 wherein, prior to step a), comprising the step of:
   connecting said expansion joint with said conveyor with at least one hoist.

5. The method as described in claim 1 wherein, prior to step a), comprising the step of:
   connecting said expansion joint to said conveyor with a pair of electrical hoists.

6. The method as described in claim 1 wherein step a) further comprises the step of moving said expansion joint via a rail supporting said conveyor.

7. A method for diverting gasses from a heat recovery steam generator and into a gas turbine generator exhaust stack comprising the steps of:
   a) removing an expansion joint attached between a diverter box and the heat recovery steam generator using least one hoist;
   b) transporting said expansion joint to a storage location;
   c) conveying a blanking plate to a position between said diverter box and the heat recovery steam generator using said at least one hoist; and
   d) affixing said blanking plate between said diverter box and the heat recovery steam generator to divert gasses into the gas turbine generator exhaust stack.

8. The method as described in claim 7, wherein after step a) further comprising the step of:
   affixing an exoskeleton around said expansion joint; and
   engaging said exoskeleton with said at least one hoist to move said expansion joint.

9. The method as described in claim 8 further comprising the step of rotating said exoskeleton and said expansion joint from a vertical position to a horizontal position.

10. The method as described in claim 7 wherein step c) further comprises the step of rotating said blanking plate from a substantially horizontal position to a substantially vertical position to fit between said diverter box and the heat recovery steam generator.

11. A method for switching power production between a simple cycle mode and a combined cycle mode, said method comprising the steps of:
- a) displacing an expansion joint from between a diverter box and a heat recovery steam generator via means for transporting said expansion joint;
- b) storing said expansion joint;
- c) moving said blanking plate into position between said diverter box and said heat recovery steam generator using said transporting means; and
- d) diverting gasses from said heat recovery steam generator into a gas turbine exhaust stack upon attaching said blanking plate to said diverter box.

12. The method as described in claim 11 wherein, after step a), further including the step of:

attaching said expansion joint to an exoskeleton; and
moving said expansion joint and said exoskeleton proximate said diverter box.

13. The method as described in claim 11 wherein step c) further comprises moving said blanking plate into a vertical storage position.

14. The method as described in claim 11 wherein, prior to step a), comprising the step of connecting said expansion joint with said transporting means.

15. The method as described in claim 11 wherein, prior to step a), comprising the step of connecting said expansion joint to said transporting means, said transporting means including a pair of electrical hoists.

* * * * *